US012767748B2

(12) United States Patent
Favero et al.

(10) Patent No.: US 12,767,748 B2
(45) Date of Patent: Oct. 20, 2026

(54) CATIONIC POLYACRYLAMIDES WITH MICRO-BLOCK STRUCTURE

(71) Applicant: SNF Group, Andrezieux Boutheon (FR)

(72) Inventors: Cédrick Favero, Andrezieux Boutheon (FR); Johann Kieffer, Andrezieux Boutheon (FR); Nicolas Boisse, Taixing City (CN); Jing Ling, Taixing City (CN)

(73) Assignee: SNF GROUP, Andrezieux Boutheon (FR)

( * ) Notice: Subject to any disclaimer, the term of this patent is extended or adjusted under 35 U.S.C. 154(b) by 437 days.

(21) Appl. No.: 18/349,309

(22) Filed: Jul. 10, 2023

(65) Prior Publication Data

US 2024/0034822 A1 Feb. 1, 2024

(30) Foreign Application Priority Data

Jul. 26, 2022 (CN) ........................ 202210882881.9

(51) Int. Cl.

*C08F 220/58* (2006.01)
*C02F 1/52* (2023.01)
*C08L 33/26* (2006.01)
*D21H 17/45* (2006.01)

(52) U.S. Cl.

CPC ........ *C08F 220/585* (2020.02); *C02F 1/5272* (2013.01); *C08L 33/26* (2013.01); *D21H 17/455* (2013.01)

(58) Field of Classification Search

CPC .... C08F 220/585; C02F 1/5272; C08L 33/26; D21H 17/455

See application file for complete search history.

(56) References Cited

U.S. PATENT DOCUMENTS 4,983,698 A * 1/1991 Robinson .............. C08F 220/56 526/287
2019/0241509 A1* 8/2019 Kayser .................... C08F 10/00

* cited by examiner

*Primary Examiner* — Haidung D Nguyen
(74) *Attorney, Agent, or Firm* — HESLIN ROTHENBERG FARLEY & MESITI P.C.

(57) ABSTRACT

Provided is a polymer composition containing a water-soluble cationic copolymer P2 structured in micro-blocks obtained by radical polymerization of at least one non-ionic monomer and at least one cationic monomer, in the presence of a homopolymer P1 having an average molecular weight between 5,000 and 100,000 daltons, the homopolymer P1 having been prepared from 2-acrylamido-2-methylpropane sulphonate in salified form and in the presence of 200 to 20,000 ppm by weight of 2-methyl-2-propenyl-sulphonic acid in salified form. Related methods are also provided.

20 Claims, No Drawings

CATIONIC POLYACRYLAMIDES WITH MICRO-BLOCK STRUCTURE

CROSS REFERENCE TO RELATED APPLICATIONS

This application claims priority to Chinese patent application number 202210882881.9, filed on Jul. 26, 2022, the entire contents of which are hereby incorporated by reference herein.

FIELD OF THE INVENTION

The present invention relates to cationic polyacrylamides structured in the form of micro-blocks. More specifically, these cationic polyacrylamides are obtained by polymerization of cationic monomers in the presence of a homopolymer of 2-acrylamido-2-methylpropane sulfonate in salified form, with a weight average molecular weight of between 5,000 and 100,000 daltons, said homopolymer being obtained from 2-acrylamido-2-methylpropane sulfonate in salified form containing impurities.

PRIOR STATE OF THE ART

Cationic polyacrylamides (CPAM), synthesized with at least one cationic monomer and one nonionic monomer, are commonly used as flocculants (sludge treatment, production of drinking water) but also as dry resistance agent in the manufacturing processes of paper or cardboard.

The most common cationic monomers to obtain CPAMs are dimethyldiallylammonium chloride (DADMAC), (acryloxyethyl)trimethylammonium chloride (ADAM-MC), and (methacryloyloxyethyl)trimethylammonium chloride (MADAM-MC). CPAMs, which are mainly prepared by radical polymerization, have a significant drawback: the cationic units, which disperse randomly in the polymer chain, are not completely available. Moreover, it is known that the cationic monomers mentioned have different reactivity ratios from acrylamide. Consequently, the distribution of cationic monomers in the polymer chain is not constant. In other words, a drift in monomeric composition sets in, the CPAM comprising chains rich and chains poor in cationic monomers. Consequently, the effectiveness of CPAMs for flocculation is reduced.

In order to avoid the random distribution of the cationic monomeric units, specific molecules (templates) may be added to the CPAM polymerization feed. These molecules interact with the cationic monomer of the polymer through electrostatic forces, van der Waals forces and/or hydrogen bonds, and modify the polymerization process, the reactivity ratio of the monomer and/or the sequence distribution of the polymer molecule to finally improve the application performance of the polymer thus obtained. Therefore, if an anionic polymer (APAM) is used as a template and is added to the CPAM polymerization feed, the cationic monomer will be adsorbed and directionally distributed along the polymer chain under the force of the electric field. A CPAM comprising micro-blocks of cationic monomeric units is thus obtained.

The anionic polymer (APAM), used as a template for the synthesis of the CPAMs described above, may be an acrylate homopolymer in salified form.

However, the homopolymer of 2-acrylamido-2-methylpropane sulfonate in salified form remains the best template because the pKa delta between the cationic polymer and this homopolymer is greater than the pKa delta between the cationic polymer and the homopolymer of acrylate in salified form.

DISCLOSURE OF THE INVENTION

The applicant surprisingly discovered that the micro-block structure of a water-soluble cationic copolymer P2 is effectively controlled (size and distribution) when it is polymerized in the presence of a homopolymer P1 of 2-acrylamido-2-methylpropane sulphonic acid in salified form, of weight average molecular weight between 5,000 and 100,000 daltons, prepared from 2-acrylamido-2-methylpropane sulphonic acid in salified form containing impurities.

The cationic polymer P2 thus obtained has improved application properties when it is used as a dry strength agent in a papermaking process or as a flocculant for the treatment of waste water.

The homopolymer P1 used as a template for obtaining the cationic polymer P2 is obtained from 2-acrylamido-2-methylpropane sulfonic acid in salified form. This salified form is formed from 2-acrylamido-2-methylpropane sulfonic acid. This anionic monomer is not purified at the end of its manufacturing process: it is generally obtained by Ritter reaction or it comes from a residue or from waste or from a purge from a process for the purification of 2-acrylamido-2-methylpropane sulfonic acid.

The polymerization of this 2-acrylamido-2-methylpropane sulphonic acid in the salified form containing impurities is preferably carried out without a transfer agent. Therefore, the homopolymer (hereinafter called polymer) P1 generally does not contain phosphorus, since typically the transfer agent is a compound comprising phosphorus such as sodium hypophosphite.

More specifically, the invention relates to a polymer composition comprising a water-soluble cationic copolymer (hereinafter called polymer) P2 structured in micro-blocks. The copolymer P2 is obtained by radical polymerization of at least one non-ionic monomer and at least one cationic monomer, in the presence of a homopolymer P1 with a weight average molecular weight of between 5,000 and 100,000 daltons, said homopolymer P1 having been prepared (prior to P2) from 2-acrylamido-2-methylpropane sulphonate in salified form and in the presence of 200 to 20,000 ppm by weight of 2-methyl-2-propenyl-sulphonic acid in salified form (the ppm being expressed relative to the weight of 2-acrylamido-2-methylpropane sulfonate in salified form).

The polymer composition comprising a water-soluble cationic copolymer P2 may, in particular, be in the form of a solution (for example, an aqueous solution), an emulsion (for example, a water-in-oil emulsion), a solid composition (for example, a powder) or a suspension (for example, an aqueous suspension). The form of the polymer composition may depend on the polymerization technique used to form the polymer P2: gel polymerization; precipitation polymerization; emulsion polymerization (aqueous or reverse); suspension polymerization; reactive extrusion polymerization; water-in-water polymerization; and/or micellar polymerization.

The invention also relates to the use of the polymer composition comprising the cationic copolymer P2 as a flocculant for wastewater treatment or as a dry strength agent in a papermaking process.

As used herein, the term "water-soluble polymer" refers to a polymer which yields an aqueous solution without insoluble particles when dissolved under stirring for 4 hours at 25° C. and with a concentration of 20 $g \cdot L^{-1}$ in deionized water.

Value ranges include lower and upper bounds. Thus, the value ranges "between 0.1 and 1.0" and "from 0.1 to 1" include the values 0.1 and 1.0.

"A and/or B" means either A, or B, or A and B.

According to the present invention, the weight average molecular weight of the water-soluble polymers P1 and P2 is determined by measuring the intrinsic viscosity. The intrinsic viscosity may be measured by methods known to a person skilled in the art and may, in particular, be calculated from the values of reduced viscosity for different concentrations by a graphical method consisting in plotting the values of reduced viscosity (on the ordinate axis) based on the concentrations (on the abscissa axis) and by extrapolating the curve to a zero concentration. The intrinsic viscosity value is read on the ordinate axis or by using the least squares method. Next, the weight average molecular weight may be determined by the famous Mark-Houwink equation:

$$[\eta]=K\ M^{\alpha}$$

- $[\eta]$ represents the intrinsic viscosity of the polymer determined by the solution viscosity measurement method,
- K represents an empirical constant,
- M represents the molecular weight of the polymer,
- $\alpha$ represents the Mark-Houwink coefficient,
- $\alpha$ and K depend on the particular polymer-solvent system. Tables known to a person skilled in the art give the values of a and K according to the polymer-solvent system.

The polymer P1 has a weight average molecular weight of between 5,000 and 100,000 daltons, preferably between 5,000 and 80,000 daltons, and even more preferably between 10,000 and 50,0000 daltons.

The polymer P2 preferably has a weight average molecular weight greater than 100,000 daltons and less than or equal to 40 million daltons, more preferably between 1 and 30 million daltons.

The polymer P1 is obtained by a process of radical polymerization of 2-acrylamido-2-methylpropane sulfonic acid in salified form in aqueous solution known to a person skilled in the art.

The preferential Ritter process, which makes it possible to manufacture 2-acrylamido-2-methylpropane sulfonic acid, induces the formation of impurities such as 2-methyl-2-propenyl-sulfonic acid and 2-methylidene-1,3-propylene-disulfonic acid. Since the salified version of 2-acrylamido-2-methylpropane sulfonic acid, used for the polymerization of P1, generally comes from the Ritter process without any purification or comes from the purge of a purification, it contains significant quantities of the impurities previously described in salified form.

Preferably, 2-acrylamido-2-methylpropane sulphonic acid in salified form for the preparation of homopolymer P1 contains between 300 and 10,000 ppm of 2-methyl-2-propenyl-sulphonic acid in salified form. Thus, the homopolymer P1 is advantageously prepared in the presence of 300 to 10,000 ppm of 2-methyl-2-propenylsulfonic acid in salified form.

Preferably, independently or not, 2-acrylamido-2-methylpropane sulphonic acid in salified form for the preparation of the homopolymer P1, contains between 300 and 10,000 ppm by weight of 2-methylidene-1,3-propylenedisulphonic acid in salified form. Thus, the homopolymer P1 is advantageously prepared in the presence of 300 to 10,000 ppm of 2-methylidene-1,3-propylenedisulfonic acid in salified form.

The salt form of 2-acrylamido-2-methylpropane sulfonic acid and the previously mentioned impurities is the same for these three salts. It is generally an alkali metal salt, chosen from sodium, lithium, potassium and/or an alkaline-earth salt chosen from magnesium, calcium and/or an ammonium salt.

Preferably, the salts of 2-acrylamido-2-methylpropanesulfonic and 2-methyl-2-propenylsulfonic acids, as well as the salt of 2-methylidene-1,3-propylenedisulfonic acid, if present, are sodium salts.

Polymer P2 is a cationic copolymer obtained by radical polymerization of at least one nonionic monomer and at least one cationic monomer in the presence of polymer P1.

Preferably, the cationic monomer of the polymer P2 is chosen from the group comprising quaternized or salified dimethylaminoethyl acrylate (ADAME), quaternized or salified dimethylaminoethyl methacrylate (MADAME), diallyldimethylammonium chloride (DADMAC), acrylamidopropyltrimethylammonium chloride (APTAC), methacrylamidopropyltrimethylammonium chloride (MAPTAC), and mixtures thereof.

Preferably, the nonionic monomer of the polymer P2 is chosen from the group comprising acrylamide, methacrylamide, N-alkylacrylamides, N-alkylmethacrylamides, N,N-dialkylacrylamides, N,N-dialkylmethacrylamides, alkoxylated esters acrylic acid, alkoxylated esters of methacrylic acid, N-vinylpyridine, N-vinylpyrrolidone, hydroxyalkylacrylates, hydroxyalkylmethacrylates, N-vinylformamide, and mixtures thereof, the alkyl groups being linear and $C_1$-$C_3$. Preferably, the nonionic monomer is acrylamide and, therefore, the polymer P2 is a cationic polyacrylamide.

In addition to non-ionic monomers and cationic monomers, monomers having a hydrophobic character may also be used in the preparation of the polymer P2. They are preferably chosen from the groups comprising esters of (meth)acrylic acid having an alkyl, arylalkyl, propoxylated, ethoxylated, and/or ethoxylated and propoxylated chain; (meth)acrylamide derivatives having an alkyl, arylalkyl propoxylated, ethoxylated, ethoxylated and propoxylated, and/or dialkyl chain; alkyl aryl sulphonates or mono- or di-substituted (meth)acrylamide amides having an alkyl, arylalkyl, propoxylated, ethoxylated, and/or ethoxylated and propoxylated chain; (meth)acrylamide derivatives having an alkyl, arylalkyl propoxylated, ethoxylated, ethoxylated and propoxylated, and/or dialkyl chain; alkyl aryl sulfonates and mixtures thereof. In this list, alkyl chains have at least two carbon atoms and usually at most 8 carbon atoms, and aryl alkyl or alkyl aryl chains have at least 7 carbon atoms and usually at most 15 carbon atoms.

Advantageously, the polymer P2 is free from anionic monomer and/or zwitterionic monomer.

According to the invention, the polymer P2, beyond the block structure, may have a linear, branched, "star" (i.e., star-shaped), "comb" (i.e., comb-shaped), and/or dendritic structure. These structures may be obtained by selecting the initiator, the transfer agent, if it is present (case not preferred), the radical polymerization technique such as the controlled technique called Reversible Addition-Fragmentation chain-Transfer (RAFT), or the polymerization technique in the presence of nitroxides called Nitroxide Mediated Polymerization (NMP), or the Atom Transfer Radical Polymerization (ATRP) technique, the incorporation of structural monomers and the concentration.

According to the invention, the polymer P2 is advantageously linear or structured. The term "structured polymer" is understood to mean a non-linear polymer which has side-chains so as to obtain, when this polymer is dissolved in water, a strong state of entanglement leading to very high low-gradient viscosities. However, the structured polymer according to the invention remains water-soluble.

The water-soluble polymer P2 may also be structured:

by at least one structural agent, which may be chosen from the group comprising polyethylenically unsaturated monomers (i.e., having at least two unsaturated functions), such as, for example, the vinyl, allylic, acrylic and epoxy functions; mention may be made, for example, of methylene bis acrylamide (MBA), triallylamine or tetraallylammonium chloride or 1,2 dihydroxyethylene bis-(N-acrylamide), and/or by macro-initiators such as polyperoxides, polyazos and polytransfer agents such as polymercaptans, and polyols, and/or by functionalized polysaccharides.

The amount of branching/crosslinking agent in the monomer mixture is advantageously less than 4% by weight, more advantageously less than 1%, and even more advantageously less than 0.5% relative to the total monomer content. According to one particular embodiment, it may be at least equal to 0.00001% by weight relative to the total monomer content.

In general, the polymer P2 does not require the development of a particular polymerization process. Indeed, it may be obtained according to all the polymerization techniques well known to a person skilled in the art. It may, in particular, be polymerization in solution; gel polymerization; precipitation polymerization; emulsion polymerization (aqueous or reverse); suspension polymerization; reactive extrusion polymerization; water-in-water polymerization; and/or micellar polymerization.

Advantageously, the polymer P2 is obtained by a gel or inverse emulsion polymerization process, known to a person skilled in the art. The polymer P1 is added at the same time as the cationic and nonionic monomers and any other monomers at the start of the polymerization, generally before the addition of any initiator (azo compound, peroxide and/or redox systems).

In a preferred embodiment, the polymer P2 is polymerized from 10 to 90 mol % of cationic monomers and from 10 to 90 mol % of nonionic monomers, preferably, advantageously in the absence of other monomers. Either way, the total of the monomers constitutes 100 mol % of monomers.

Advantageously, the ratio of the moles of cationic monomers in P2 relative to the moles of 2-acrylamido-2-methylpropane sulfonate in salified form in P1 is between 0.2 and 3, preferably between 0.5 and 2, preferably between 0, 6 and 1.5, even more preferably between 0.8 and 1.2.

The invention also relates to the use of the polymer composition comprising the cationic polymer P2 as a flocculant for the treatment of waste water or as a dry strength agent in a papermaking process.

As regards the treatment of waste water, the polymer composition comprising the polymer P2 may be used alone or in combination with at least one other water-soluble polymer. This other water-soluble polymer may be an inorganic or organic coagulant typically chosen from poly (diallyldimethylammonium chloride), polyamines, iron salts and aluminum salts, such as, for example, ferric chlorides and aluminum chlorides.

As regards the papermaking process, according to a preferred embodiment, the polymer composition comprising the polymer P2 is advantageously introduced (i) into the white waters and/or (ii) the slurry and/or (iii) the mixture formed by the white water and the slurry after homogenization of the fibrous suspension in the fan pump.

Advantageously, the polymer composition comprising the polymer P2 may also be introduced into the papermaking process at the forming table, for example by spraying or in the form of a foam, and/or at the size press.

Advantageously, between 0.1 and 10 $kg \cdot t^{-1}$, and preferably between 0.2 and 5.0 $kg \cdot t^{-1}$ of polymer P2 are added to the fibrous suspension.

The fibrous suspension may include all usable cellulosic fibers as they are known to a person skilled in the art: virgin fibers, recycled fibers, chemical pulp, mechanical pulp, micro-fibrillated cellulose and/or nano-fibrillated cellulose. The fibrous suspension also includes the use of these different cellulosic fibers with all types of fillers such as $TiO_2$, $CaCO_3$ (crushed or precipitated), kaolin organic fillers and mixtures thereof.

The polymer composition comprising the polymer P2 may be used within the papermaking process in combination with at least one other product chosen from inorganic or organic coagulants, dry strength agents, wet strength agents, natural polymers such as starches or carboxymethylcellulose (CMC), inorganic microparticles such as bentonite microparticles and colloidal silica microparticles organic polymers of any ionic nature (nonionic, cationic, anionic or amphoteric) and which may be (without being limiting) linear, branched, cross-linked, hydrophobic or associative, and mixtures thereof.

The following examples illustrate the invention without, however, limiting its scope.

EXEMPLARY EMBODIMENTS OF THE INVENTION

Example 1: Synthesis of Polymers P1a, P1b and P1c

In a 1-liter jacketed reactor, equipped with a condenser and a stirrer, 190 g of deionized water are added to be heated to 80° C. under a nitrogen atmosphere (nitrogen flow).

A sodium persulfate solution is prepared in a dropping funnel, by dissolving 17 g of sodium persulfate in 100 g of deionized water. Into a second dropping funnel are charged 690 g of a sodium salt solution of 2-acrylamido-2-methylpropane sulfonic acid at 50% concentration by weight. A high-pressure liquid chromatography analysis indicates an amount of 1556 ppm of 2-methyl-2-propenyl-sulfonic acid in the form of sodium salt and 450 ppm of 2-methylidene-1,3-propylenedisulfonic acid in the form of salt sodium.

The sodium persulfate solution is added to the reactor over a period of 120 minutes, and the sodium salt solution of 2-acrylamido-2-methylpropane sulfonic acid is added concomitantly over a period of 90 minutes. During the addition of these reagents, and then again for 60 min (counted after addition of the sodium persulfate), the reaction medium is maintained at 80° C. The polymer P1a according to the invention thus obtained has a weight average molecular weight equal to 47,000 daltons (determined from the intrinsic viscosity).

The synthesis of a P1 b polymer is undertaken by carrying out the same protocol as previously with the only difference that the polymerization temperature is maintained at 100° C. The polymer P1 b according to the invention thus obtained has a weight average molecular weight equal to 24,600 daltons (determined from the intrinsic viscosity).

The synthesis of a polymer P1c is undertaken by carrying out the same protocol as previously (polymer P1a) with the only difference that the 2-methylpropane sulfonic acid contains an amount of 102 ppm of 2-methyl-2-propenyl-sulfonic acid as the sodium salt and 80 ppm of 2-methylidene-1,3-propylenedisulfonic acid as the sodium salt. The comparative polymer P1c thus obtained has a weight average molecular weight equal to 245,000 daltons (determined from the intrinsic viscosity).

All the P1 polymers previously described are in the form of an aqueous solution with a concentration of 40% by weight of 2-methylpropane sulfonic acid homopolymer in the sodium salt form in water.

Examples 2: Synthesis of Polymer Compositions Comprising the Polymers P2a and P2b According to the Invention and Comparative Polymers P2c and P2d 522 g of deionized water, 202 g of dimethylaminoethyl acrylate quaternized with methyl chloride (80% concentration by weight in water), 276 g of acrylamide (50% concentration by weight in water) and 405 g of polymer P1a (40% concentration by weight in water) are added in a 2000-mL beaker.

The solution thus obtained is cooled to between 5 and 10° C. then transferred to an adiabatic polymerization reactor. A nitrogen bubbling is then carried out for 30 minutes in order to eliminate all traces of dissolved oxygen.

Are then added to the reactor:

- 0.45 g of 2,2'-azobisisobutyronitrile,
- 1.5 mL of an aqueous solution at 2.5 g/L of 2,2'-Azobis [2-(2-imidazolin-2-yl)propane] dihydrochloride,
- 1.5 mL of a 1 g/L aqueous solution of sodium hypophosphite,
- 1.5 mL of a 1 g/L aqueous solution of tert-butyl hydroperoxide,
- 1.5 mL of an aqueous solution at 1 g/L of ammonium sulphate and iron (II) hexahydrate (Mohr's salt).

After a few minutes, the nitrogen bubbling is stopped. The polymerization reaction takes place for 4 hours to reach a temperature peak. At the end of this period, the polymer gel obtained is chopped then dried then ground again to obtain a polymer P2a according to the invention in the form of a powder with a weight average molecular weight equal to 8,230,600 daltons (determined from the intrinsic viscosity).

A polymer P2b is obtained by applying the same protocol with, instead of polymer P1a: polymer P1b. The polymer P2b according to the invention thus obtained in powder form has a weight average molecular weight equal to 8,320,500 daltons (determined from the intrinsic viscosity).

A polymer P2c is obtained by applying the same protocol with, instead of the P1a polymer: the P1c polymer. The comparative polymer P2c thus obtained in powder form has a weight average molecular weight equal to 8,400,500 daltons (determined from the intrinsic viscosity).

A polymer P2d is obtained by applying the same protocol but in the absence of polymer P1. The comparative polymer P2d thus obtained in powder form has a weight average molecular weight equal to 8,125,000 daltons (determined from the intrinsic viscosity).

Example 3: Application Performance of Polymer Compositions Comprising Polymers P2a and P2b According to the Invention, and Comparative P2c and P2d in a Papermaking Process Retention aids are polymers added to cellulosic fiber slurries prior to paper formation in order to improve the efficiency with which fine particles, including cellulosic fines, are retained in the paper product.

Type of Paper Pulp Used

Virgin Fiber Pulp:

The wet pulp is obtained by disintegrating the dry pulp to obtain a final aqueous concentration of 1% by weight. It is a neutral pH pulp composed of 90% bleached virgin long fiber, 10% bleached virgin short fiber and an additional 30% GCC (ground calcium carbonate) by weight based on fiber weight.

Assessment of Total Retention and Ash Retention

For all the following tests, the polymer solutions are prepared at 0.5% by weight. After 45 minutes of preparation, the polymer solutions are diluted 10 times before injection.

The various results are obtained using a Britt Jar type device with a stirring speed of 1000 rpm.

The process sequence is as follows:

- T=0 s: Stirring of 500 mL of paper pulp at a concentration of 0.5% by weight.
- T=10 s: Addition of the retention agent (300 g of dry polymer P2/ton of dry pulp).
- T=20 s: Sampling of the first 20 mL corresponding to the dead volume under the cloth, then recovery of 100 mL of white water.

The percentage of First Pass Retention (% FPR), corresponding to the total retention, is calculated according to the following formula: % FPR=(CHB−CWW)/CHB*100 where:

CHB: Headbox consistency; and

CWW: White water consistency.

The First Pass Ash Retention percentage (% FPAR), corresponding to the total retention, is calculated according to the following formula: % FPAR=(AHB−AWW)/AHB*100 where:

AHB: Headbox ash consistency; and

AWW: White water ash consistency.

For each of these analyses, the highest values correspond to the best performance.

The results are summarized in Table 1.

Gravity Drainage Performance Evaluation using the Canadian Standard Freeness (CSF)

In a beaker, the pulp is processed at a stirring speed of 1000 rpm.

The process sequence is as follows:

- T=0 s: Stirring of 500 mL of pulp at a concentration of 0.6% by weight.
- T=10 s: Addition of the retention agent (300 g of dry polymer P2/ton of dry pulp).
- T=20 s: Stirring stopped and addition of the amount of water necessary to obtain 1 liter.

This liter of pulp is transferred to the "Canadian Standard Freeness Tester" and the TAPPI T227om-99 procedure is applied.

The volume, expressed in mL, recovered by the side arm, gives a measure of the gravity drainage. The higher the value, the better the gravity drainage.

This performance may also be expressed by calculating the percent improvement over blank (% CSF).

Higher values correspond to better performance. The results in Table 1 show that the polymer compositions comprising the P2 polymers according to the invention (P2a and P2b) make it possible to improve the drainage performance and the total retention compared to the comparative polymers P2c and P2d.

TABLE 1

| Polymer | % FPAR | % FPR | % CSF |
|---|---|---|---|
| P2a | 32.4 | 71.23 | 7.5 |
| P2b | 33.3 | 74.4 | 11.3 |
| P2c | 20.3 | 64.5 | 1.7 |
| P2d | 19.1 | 61.8 | 1.5 |

Example 4: Flocculation Test of the Polymer Compositions Comprising the Polymers P2a and P2b According to the Invention, and Comparative P2c and P2d The polymers are dissolved in tap water to obtain aqueous solutions with a concentration of 0.4% by weight of polymer relative to the total weight of the solution. The solutions are mechanically stirred at 500 rpm until complete solubilization of the polymers and obtaining clear and homogeneous solutions.

A series of flocculation tests are carried out on a mining effluent from a coal mine having a solids content of 17.4% by weight.

An amount of each solution, corresponding to a polymer dosage of 280 g of polymer per ton of dry matter from the mining effluent, is added to 200 g of mining effluent. Thorough mixing is done manually until optimal flocculation and water release are observed.

The result is expressed by Net Water Release (NWR) which corresponds to the total amount of water recovered 1 hour after the flocculation test, minus the amount of water unduly added during the incorporation of the aqueous polymer solution in the suspension. The same NWR is calculated after 24 hours, which gives a good indication of the maximum water release.

At the end of these 24 hours, the turbidity of the water supernatant thus released is also measured.

The results in Table 2 demonstrate that the polymer compositions comprising the polymers P2a and P2b according to the invention make it possible to improve the NWR and the turbidity of the supernatant (compared to the comparative polymers P2c and P2d).

TABLE 2

| Polymer | 1 hour NWR | 24 hour NWR | Turbidity (NTU) |
|---|---|---|---|
| P2a | 87 | 90 | 12 |
| P2b | 89 | 93 | 9 |
| P2c | 74 | 76 | 25 |
| P2d | 72 | 73 | 44 |

The invention claimed is:

1. A polymer composition comprising a water-soluble cationic copolymer P2 structured in micro-blocks obtained by radical polymerization of at least one non-ionic monomer and at least one cationic monomer, in the presence of a homopolymer P1 having an average molecular weight between 5,000 and 100,000 daltons, wherein said homopolymer P1 has been prepared from 2-acrylamido-2-methylpropane sulphonate in salified form and in the presence of 200 to 20,000 ppm by weight of 2-methyl-2-propenyl-sulphonic acid in salified form.

2. The polymer composition according to claim 1, wherein the homopolymer P1 is prepared in the presence of 300 to 10,000 ppm of 2-methyl-2-propenyl-sulfonic acid in salified form.

3. The polymer composition according to claim 1, wherein the homopolymer P1 is prepared in the presence of 300 to 10,000 ppm by weight of 2-methylidene-1,3-propylenedisulfonic acid in salified form, in addition to the 200 to 20,000 ppm by weight of 2-methyl-2-propenyl-sulphonic acid in salified form.

4. The polymer composition according to claim 1, wherein the salified forms of 2-acrylamido-2-methylpropane sulfonic acid, and of 2-methyl-2-propenyl sulfonic acid are sodium salts.

5. The polymer composition according to claim 1, wherein the water-soluble cationic copolymer P2 is water-soluble and has a weight average molecular weight greater than 100,000 daltons and less than or equal to 40 million daltons.

6. The polymer composition according to claim 1, wherein the cationic monomer of the water-soluble cationic copolymer P2 is chosen from the group consisting of quaternized or salified dimethylaminoethyl acrylate (ADAME), quaternized or salified dimethylaminoethyl methacrylate (MADAME), diallyldimethylammonium chloride (DADMAC), acrylamidopropyltrimethylammonium chloride (APTAC), methacrylamidopropyltrimethylammonium chloride (MAPTAC), and mixtures thereof.

7. The polymer composition according to claim 1, wherein the nonionic monomer of the water-soluble cationic copolymer P2 is chosen from the group consisting of acrylamide, methacrylamide, N-alkylacrylamides, N-alkylmethacrylamides, N,N-dialkylacrylamides, N,N-dialkylmethacrylamides, alkoxylated esters of acrylic acid, alkoxylated esters of methacrylic acid, N-vinylpyridine, N-vinylpyrrolidone, hydroxyalkylacrylates, hydroxyalkylmethacrylates, and mixtures thereof, the alkyl groups being linear and $C_1$-$C_3$.

8. The polymer composition according to claim 1, wherein the cationic monomer represents 10 to 90 mol % of the water-soluble cationic copolymer P2, and in that the at least one nonionic monomer represents 10 to 90 mol % of the water-soluble cationic copolymer P2.

9. The polymer composition according to claim 1, wherein the ratio of the moles of cationic monomers in the water-soluble cationic polymer P2 relative to the moles of 2-acrylamido-2-methylpropane sulfonate in salified form in P1 is between 0.2 and 3.

10. The polymer composition according to claim 2, wherein the homopolymer P1 is prepared in the presence of 300 to 10,000 ppm by weight of 2-methylidene-1,3-propylenedisulfonic acid in salified form, in addition to the 300 to 10,000 ppm of 2-methyl-2-propenyl-sulfonic acid in salified form.

11. The polymer composition according to claim 10, wherein the salified forms of 2-acrylamido-2-methylpropane sulfonic acid, 2-methyl-2-propenyl sulfonic acid, and 2-methylidene-1,3-propylenedisulfonic acid, are sodium salts.

12. The polymer composition according to claim 10, wherein the water-soluble cationic copolymer P2 is water-soluble and has a weight average molecular weight greater than 100,000 daltons and less than or equal to 40 million daltons.

13. The polymer composition according to claim 11, wherein the water-soluble cationic copolymer P2 is water-soluble and has a weight average molecular weight greater than 100,000 daltons and less than or equal to 40 million daltons.

14. The polymer composition according to claim 10, wherein:

the cationic monomer of the water-soluble cationic copolymer P2 is chosen from the group consisting of quaternized or salified dimethylaminoethyl acrylate (ADAME), quaternized or salified dimethylaminoethyl methacrylate (MADAME), diallyldimethylammonium chloride (DADMAC), acrylamidopropyltrimethylammonium chloride (APTAC), methacrylamidopropyltrimethylammonium chloride (MAPTAC), and mixtures thereof; and the nonionic monomer of the water-soluble cationic copolymer P2 is chosen from the group consisting of acrylamide, methacrylamide, N-alkylacrylamides, N-alkylmethacrylamides, N,N-dialkylacrylamides, N,N-dialkylmethacrylamides, alkoxylated esters of acrylic acid, alkoxylated esters of methacrylic acid, N-vinylpyridine, N-vinylpyrrolidone, hydroxyalkylacrylates, hydroxyalkylmethacrylates, and mixtures thereof, the alkyl groups being linear and $C_1$-$C_3$.

15. The polymer composition according to claim 14, wherein the water-soluble cationic copolymer P2 is water-soluble and has a weight average molecular weight greater than 100,000 daltons and less than or equal to 40 million daltons.

16. The polymer composition according to claim 11, wherein:

the cationic monomer of the water-soluble cationic copolymer P2 is chosen from the group consisting of quaternized or salified dimethylaminoethyl acrylate (ADAME), quaternized or salified dimethylaminoethyl methacrylate (MADAME), diallyldimethylammonium chloride (DADMAC), acrylamidopropyltrimethylammonium chloride (APTAC), methacrylamidopropyltrimethylammonium chloride (MAPTAC), and mixtures thereof; and the nonionic monomer of the water-soluble cationic copolymer P2 is chosen from the group consisting of acrylamide, methacrylamide, N-alkylacrylamides, N-alkylmethacrylamides, N,N-dialkylacrylamides, N,N-dialkylmethacrylamides, alkoxylated esters of acrylic acid, alkoxylated esters of methacrylic acid, N-vinylpyridine, N-vinylpyrrolidone, hydroxyalkylacrylates, hydroxyalkylmethacrylates, and mixtures thereof, the alkyl groups being linear and $C_1$-$C_3$.

17. The polymer composition according to claim 16, wherein the water-soluble cationic copolymer P2 is water-soluble and has a weight average molecular weight greater than 100,000 daltons and less than or equal to 40 million daltons.

18. The polymer composition according to claim 15, wherein the cationic monomer represents 10 to 90 mol % of the water-soluble cationic copolymer P2, and in that the at least one nonionic monomer represents 10 to 90 mol % of the water-soluble cationic copolymer P2.

19. The polymer composition according to claim 15, wherein the ratio of the moles of cationic monomers in the water-soluble cationic polymer P2 relative to the moles of 2-acrylamido-2-methylpropane sulfonate in salified form in P1 is between 0.2 and 3.

20. A method for treating waste water or improving a papermaking process, said method comprising adding the polymer composition according to claim 1 to an aqueous solution as a flocculant or dry strength agent.

* * * * *